Figure 1:
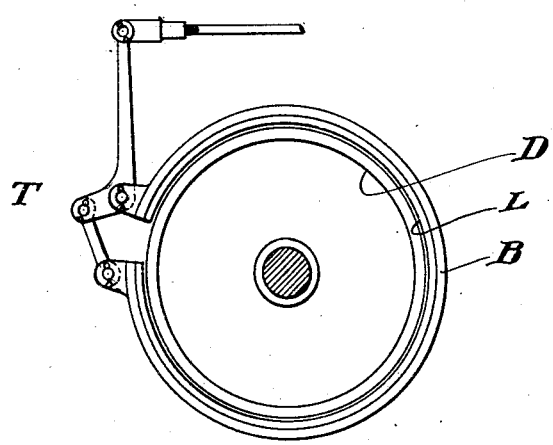

W. R. SEIGLE.
BRAKE OR CLUTCH.
APPLICATION FILED JUNE 28, 1920.

1,409,247.

Patented Mar. 14, 1922.

Inventor
William R. Seigle
by Roberts, Roberts & Cushman
his Attorneys

UNITED STATES PATENT OFFICE.

WILLIAM R. SEIGLE, OF NEW YORK, N. Y.

BRAKE OR CLUTCH.

1,409,247.  Specification of Letters Patent.  Patented Mar. 14, 1922.

Application filed June 28, 1920. Serial No. 392,374.

*To all whom it may concern:*

Be it known that I, WILLIAM R. SEIGLE, a citizen of the United States of America, and resident of New York, in the county of New York and State of New York, have invented new and useful Improvements in Brakes or Clutches, of which the following is a specification.

My invention relates to the construction of brake or clutch bands, and is characterized by the employment of a lining of friction-material which possesses inherent resiliency, so that the brake or clutch band of which such lining forms part, when made in curved form with a radius different in dimension from the radius of the brake or clutch drum to which the band is applied, will tend always to relax or spring away from the drum-surface, and will thus minimize or wholly eliminate undesirable dragging of the brake or clutch.

Since a friction-clutch is in its structural and functional essentials substantially the same as a brake, the term "brake-band" is herein used to designate descriptively a band whether used in a brake or a clutch.

The material of which the lining of my improved brake-band is to be composed will, preferably, be made according to the method and represent the product which is described in an application for Letters Patent of the United States filed by me concurrently herewith, serially numbered 392,373; but brake linings otherwise composed, if they possess the characteristics above outlined, may be employed in carrying out the invention herein described and made the subject of claim.

Briefly described, the brake-lining material described in my aforesaid application comprises a body of felted fibrous material (preferably asbestos fiber in large part at least) built up in curved surface or arcuate form, e. g. cylindrically, by the layer-accretion method, out of successively superposed layers of a thin paper-like web, then set or hardened in the original form and afterward cut into brake lining segments of such circumferentially subtended angles as may be desired. These fibre-bodies in order to be made as effective as possible for brake-service, are impregnated with binding material, cementitious in character which integrates the fibres, strengthens the body composed thereof, and produces a surface which furnishes the desired coefficient of sliding friction.

Whether built or constructed in the manner indicated, or not, the brake-lining which is one of the characteristics of the herein described and claimed invention will be curvilinear arcuate or segmental in form, as represented by cylindrical conformation, and have a radius of surface-curvature different from the radius of the brake-drum; larger if the brake-band is to be externally applied, smaller if it is to be internally applied.

In the drawings hereto annexed which illustrate my invention—

Figure 2:
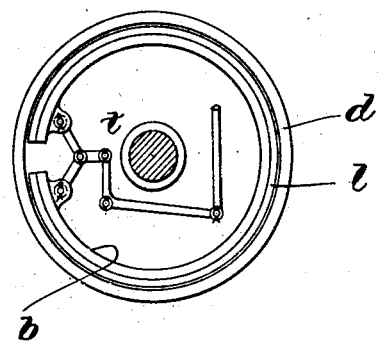

Fig. 1 shows, in elevation, a brake-drum with a brake-band externally applied; and Fig. 2 shows in elevation, a brake-drum with a brake-band internally applied.

In Fig. 1 D represents the brake-drum, L the brake lining having the characteristics above stated, and B the backing or carrier for the lining. T represents a toggle contrivance for drawing the brake-band by contraction into contact with the periphery of the drum D.

The brake-band, comprising the backing B and resilient lining L, is here shown in its relaxed, or idle position. The backing B is to be made of flexible material, and preferably will be resilient also. In the position shown, the resilient lining L assumes what may be termed its natural curvature, the radius of which is greater than that of the periphery of the drum D. The resiliency of the backing B to which the lining L is securely attached, may constrain the lining L to assume a radius of curvature which departs, one way or the other from its natural radius, i. e. that which it assumes when no bending stress is applied to it, but this variation from the natural curvature of the lining L will be slight. Application of force to and through the toggle T will contract the brake-band and draw the lining into contact with the drum; release of this force permits the inherent resiliency of the brake lining (and that of the backing also, if it be so designed) to assert itself, and the brake-lining will spring away from the brake drum and relax the braking action entirely.

As the brake lining L wears away, its inner radius will increase, and in like measure the amount of contractile movement necessary to apply the brake will increase. Thus, as the total resiliency of the brake-lining is reduced by reduction of its radial cross-section, the amount of flexion necessary to brake-application will increase, so that, approximately, the normal brake-releasing effort of the lining and backing together will remain substantially constant throughout the life of the brake-lining in service.

In Fig. 2, which represents a brake band for internal application to a brake-drum, $d$ is the brake-drum, $l$ the brake-band lining, and $b$ the backing. The toggle-contrivance $t$ serves in the well-known manner to apply and release the brake. In this form of my invention, the brake-lining is, when undistorted and free from stress, of smaller radius than the inner cylindrical surface of the brake-drum $d$, so that the resiliency of the lining performs, in respect to an internal drum surface, the same releasing function as that of the lining L, in the example illustrated by Figure 1.

In both figures of the drawing, nothing but the elements or factors of brake construction which relate to the characteristics of my invention are shown. The usual suspension of the brake-band, which may be of several specific varieties, is not shown; its construction and application are well-known.

I claim:

In a brake or clutch, the combination, with a drum, of a band comprising arcuate resilient lining, the proportions and resiliency of the lining being such that when idle it is drawn away from the drum.

Signed by me at New York, N. Y. this 25th day of June 1920

WILLIAM R. SEIGLE.